United States Patent [19]
Jouhal et al.

[11] 3,803,969
[45] Apr. 16, 1974

[54] SCRAP SHEAR WITH LEVER DRIVE

[75] Inventors: Tfja S. Jouhal; William E. Brake, both of Cordele, Ga.

[73] Assignee: Harris Press & Shear Corporation, Cordele, Ga.

[22] Filed: Apr. 19, 1972

[21] Appl. No.: 245,430

[52] U.S. Cl. .................................. 83/627, 83/923
[51] Int. Cl. ............................................. B26d 5/12
[58] Field of Search ............ 83/627, 633, 634, 644, 83/643, 639, 646, 923; 100/270, 271, 280

[56] References Cited
UNITED STATES PATENTS
2,261,576  11/1941  Wood .............................. 100/280 X
2,778,341  1/1957  Papanoli et al. ................. 83/643 X
448,192  3/1891  Aiken ............................... 83/627 X FOREIGN PATENTS OR APPLICATIONS
189,126  5/1905  Germany .............................. 83/627

Primary Examiner—J. M. Meister
Attorney, Agent, or Firm—Cushman, Darby & Cushman

[57] ABSTRACT

A scrap metal shearing apparatus includes a vertically movable shearing head which is reciprocated by means of a lever arm pivoted at one end to the frame and actuated at its other end by means of a generally vertical drive ram. Means are provided for permitting slight linear movement of the lever arm in the direction of its longitudinal dimension.

1 Claim, 5 Drawing Figures

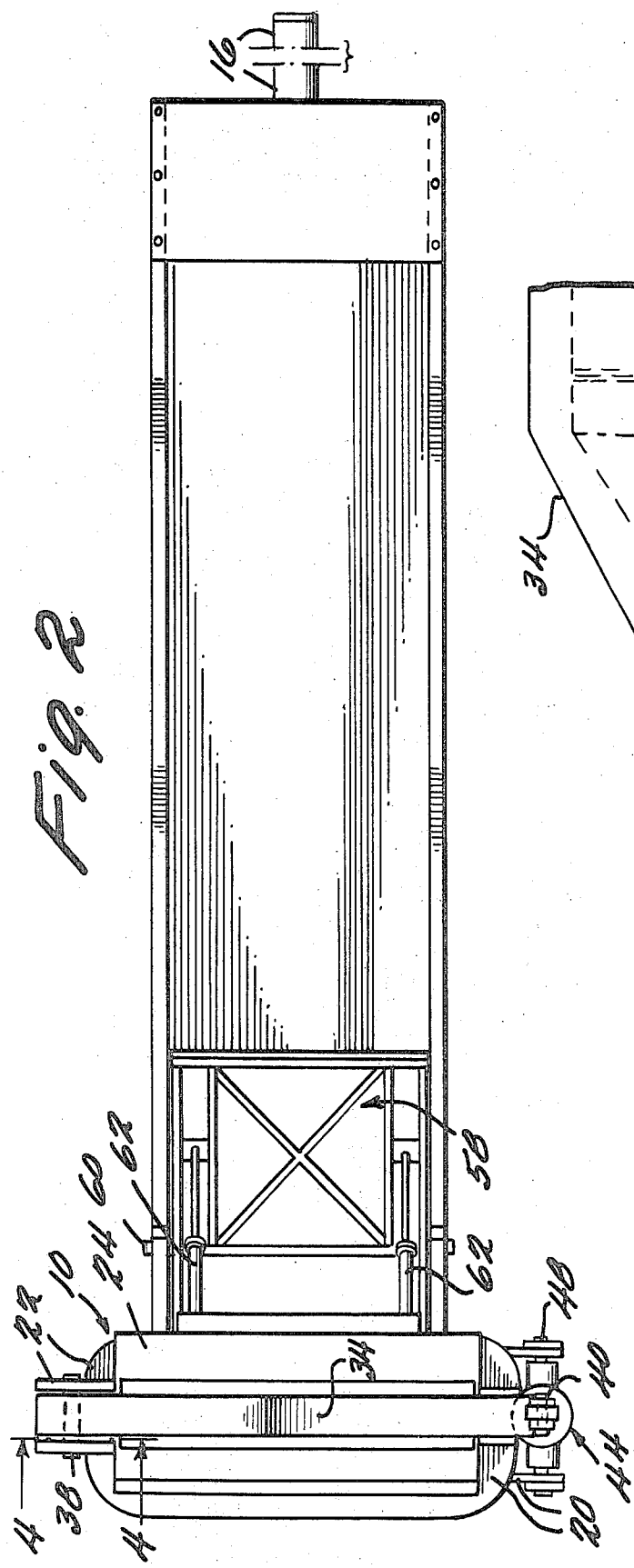
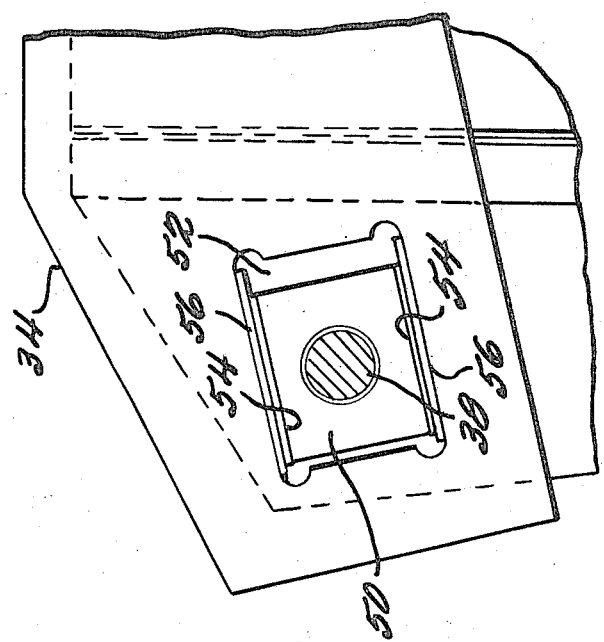

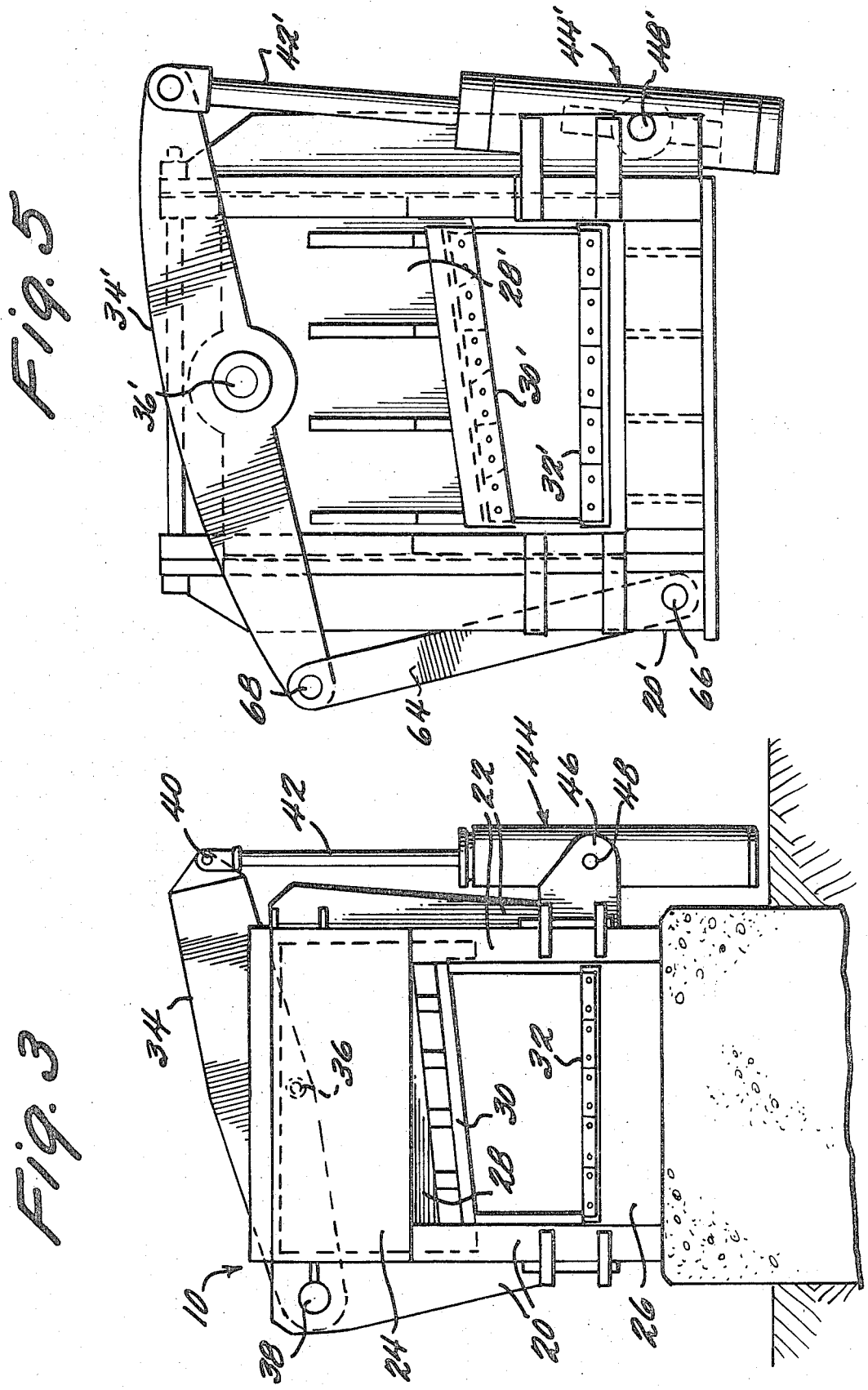

SCRAP SHEAR WITH LEVER DRIVE

This invention relates to a shearing machine and in particular to a machine for shearing scrap metal.

A scrap shearing machine typically comprises a table and a feed mechanism, usually a hydraulic ram, for pushing material to be sheared to a shearing station, the latter including one or more horizontal fixed cutting blades each of which has associated therewith a cooperating cutting blade which is arranged for vertical reciprocation relative to its respective fixed blade. The reciprocating blade is carried by a shearing head which is guided for movement, linear or swinging, in a vertical plane by suitable fixed framing. The shearing head is usually driven hydraulically, as by one or more vertical rams secured directly to the head as disclosed, for example, in U.S. Pat. No. 3,157,082, or secured indirectly to the head by articulated connections as disclosed, for example, in U.S. Pat. Nos. 3,136,193 and 3,272,053.

The present invention is directed to an improved shearing machine in which the drive arrangement for a reciprocable shearing head includes a lever arm mounted for swinging movement and connected at one end to a hydraulic ram. The shearing head is pivotally connected to the lever arm intermediate the ends of the arm and is guided by the frame of the machine to move in a fixed shearing plane. In the preferred embodiment the shearing head movement is linear only, and the mounting means for the lever provides for both angular and linear movement of the lever.

The invention will be further understood from the following detailed description taken with the drawings in which:

FIG. 2 is a plan view of the scrap shear of FIG. 1;

FIG. 3 is an end view of the shear of FIG. 1;

FIG. 4 is a partial sectional view, on an enlarged scale, taken on the line 4—4 of FIG. 2; and FIG. 5 is a view similar to FIG. 3 showing a modified form of scrap shear.

Figure 1:
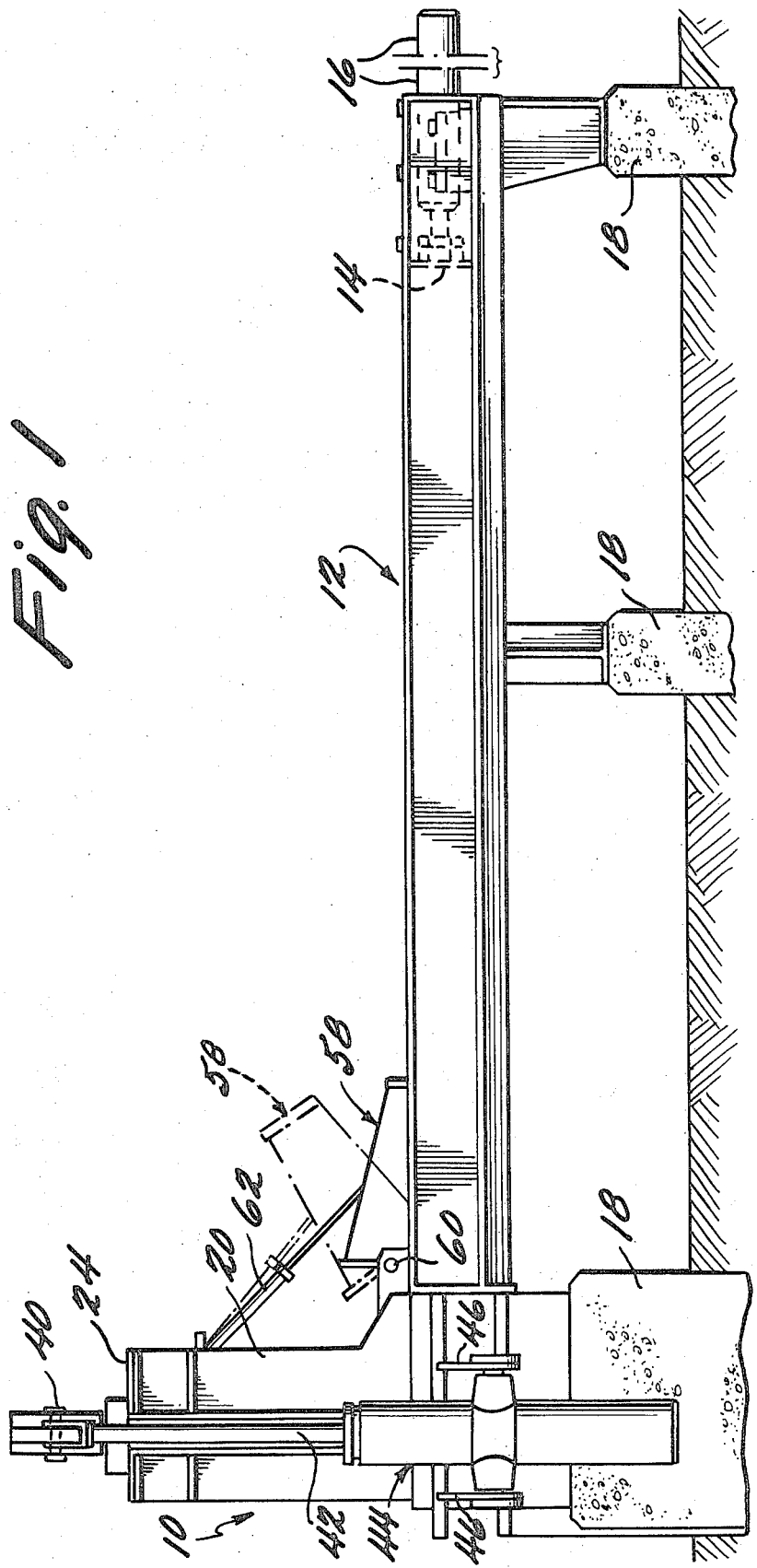
FIG. 1 is a side elevational view of a scrap metal shearing machine embodying this invention.

Referring to FIGS. 1 and 2 there is shown a scrap metal shearing machine which includes a shearing station 10 and a channel-shaped feed table 12 of elongated construction. A feed mechanism for pushing scrap metal along the feed table 12 toward the shearing station 10 includes a transverse end wall 14 which is movable toward and away from the shearing station 10 by a hydraulic ram 16, as is conventional in the art. The feed table 12 and shearing station 10 are supported in spaced relationship to the ground, as by means of concrete footings 18.

The shearing station 10 includes spaced upright reinforced side frames 20, 22, a top transverse frame 24 and a lower transverse frame 26. A shearing head 28 is disposed between the side frames 20, 22 for reciprocal linear movement in a vertical plane, the opposite ends of the shearing head 28 being slidable in guide channels (not shown) in the side frames 20, 22. The lower edge of the shearing head 28 carries an inclined cutting blade 30 which cooperates with a fixed horizontal cutting edge 32 disposed flush with the bed of the cutting station 10. The upper end portion of the shearing head 28 is pivotally connected to a massive lever arm 34 by a horizontal pin 36 extending normal to the plane of movement of the shearing head 28. One end of the arm 34 is pivotable about a pin 38 so that the arm 34 may swing about an axis which extends normal to the plane of movement of the shearing head 28. The outer end of the arm 34 is pivotally connected at 40 to the piston rod 42 of a generally vertically disposed hydraulic ram 44. The ram 44 is supported between two ears 46 extending laterally of the side frame 22 by means of a pin 48 which permits slight swinging movement of the ram 44 about an axis parallel to the pins 36 and 38.

Since the shearing head 28 moves only linearly and is pinned to the arm 34 by the pin 36, some movement of the arm 34 in a direction transverse to the swing axis of the pin 38 must be provided for. In the embodiment of FIGS. 1–3 this requirement is satisfied by allowing sliding movement between the arm 34 and the pin 38 which is supported in a fixed position in the side frame 22. Rotatably mounted on the pin 38 is a slide block 50 which is slidably carried in a slot 52 in the arm 34. The upper and lower surfaces of the block 50 carry slide plates 54 which cooperate with slide plates 56 secured to the upper and lower surfaces of the slot 52.

The machine may also include means for collapsing and consolidating certain kinds of scrap metal, such as automobile bodies, so that vertical dimension of the scrap reaching the shearing station 10 will not exceed the vertical distance between the upper and lower blades 30 and 32. This means may include a rigid lid 58 pivoted for swinging movement about an axis 60 transverse to the feed table 12. Hydraulic rams 62 may be employed to move the lid 58 between upper and lower positions.

FIG. 5 illustrates an embodiment in which transverse movement of the main arm 34' during swinging movement thereof is obtained by including a generally upright arm 64 between the framing of the machine and the arm 34'. As shown, the arm 58 may be pivoted at its lower end to the side frame 20' by a pin 66 and pivoted at its upper end to the main arm 34 by a pin 68. The vertically reciprocating shearing head 28' and the pivoted drive ram 44' and their connections to the main arm 34' may be the same as in the embodiment of FIG. 1.

In operation of the embodiment of FIGS. 1–4, which is the preferred construction, scrap metal is deposited on the feed table 12 and is then pushed therealong toward the shearing station 10 by extending the ram 16. The scrap metal is sheared into desired lengths by reciprocating the shearing head 28 with the ram 44. Retraction of the ram 44 from the position shown in FIG. 3 swings the arm 34 clockwise about the fixed pin 38 thereby moving the shearing head 28 downwardly in a linear path along the guide grooves in the side frames 20 and 22. Simultaneously the ram 44 will rock slightly clockwise due to the angular movement of the arm 34. At the same time the arm 34 will slide a short distance to the left, as viewed in FIGS. 3 and 4, with respect to the pin 38 and the slide block 50. Only clockwise rotational movement occurs at the pin 36 between the arm 34 and the shearing head 28. Extension of the ram 44 effects an opposite mode of relative movement.

The operation of the embodiment of FIG. 5 is analogous to the operation of the first embodiment. Retraction of the ram 44' rotates the main arm 34' clockwise about the pin 68 so as to move the shearing head 28' downward in a linear path. Simultaneously the arm 64 swings counterclockwise about the pin 66, and the ram swings clockwise about the pin 48'.

The arrangement of the drive ram 44 or 44' on the opposite side of the connection 36 or 36' from the swing axis 38 or 68 is preferred because it permits a less massive construction for the arm 34 or 34'. The overall arrangement is an improvement over prior arrangements in that it requires a smaller ram 44 or 44' as a result of employing a mechanical lever action. In addition the ram arrangement is capable of exerting a high pull-up force on the shearing head to overcome wedging between the cutting blades. Further, the forces which occur when the blades break through a mass of scrap metal is absorbed by the piston head and rod rather than the rod end attachments. It is also possible to reduce the weight of the frame at the shearing station by use of the present design because the bending forces on the side frames are less. A further advantage is that the frame height is lower, thereby simplifying shipping and erecting.

What is claimed is:

1. Shearing apparatus comprising: a shearing head provided along its lower edge with a cutting blade and disposed for vertical movement in a vertical plane between two upright side frames; a generally upright hydraulic ram pivotally supported by one of said side frames for slight swinging movement about an axis which is mormal to the plane of movement of said shearing head; a lever arm having one end pivotally connected to the upper end of said ram; means associated with the other side frame and mounting the other end of said lever arm for swinging movement about an axis normal to said vertical plane and for slight linear movement in a direction along the length of said lever arm, said means including a bearing block mounted on said other side frame for pivotal movement about said axis, said bearing block residing in a slot in said lever arm and having upper and lower surfaces slidably engaging complementary surfaces of said slot whereby linear movement of said lever arm relative to said pin and said block occurs during movement of said lever arm; and pivot means connecting said lever arm at a location intermediate its ends to said shearing head.

* * * * *